United States Patent [19]

Gradwohl et al.

[11] 4,227,709
[45] Oct. 14, 1980

[54] CONVERTIBLE HAND TRUCK-WAGON

[76] Inventors: Donald R. Gradwohl; Jonald R. Gradwohl, both of 20843 SW. WillapaWay, Tualatin, Oreg. 97062

[21] Appl. No.: 962,092

[22] Filed: Dec. 4, 1978

Related U.S. Application Data

[63] Continuation-in-part of Ser. No. 871,007, Jan. 20, 1978, abandoned.

[51] Int. Cl.³ ............................ B62B 1/04; B62B 3/02
[52] U.S. Cl. .............................. 280/47.11; 280/47.18; 280/47.28
[58] Field of Search ................... 280/47.18, 30, 47.27, 280/47.28, 47.11, 87.01, 87.05, 46, 98; 414/446; 296/35 A

[56] References Cited

U.S. PATENT DOCUMENTS

| 1,215,718 | 2/1917 | Salisbury | 414/446 |
| 1,574,036 | 2/1926 | Hubbard | 280/87.01 X |
| 2,472,989 | 6/1949 | Skipper et al. | 280/47.18 X |
| 2,680,027 | 6/1954 | DePuydt et al. | 280/47.28 |
| 3,679,225 | 7/1972 | McKinney | 280/47.18 |
| 3,860,252 | 1/1975 | Martens | 280/98 |

FOREIGN PATENT DOCUMENTS

| 72685 | 4/1970 | German Democratic Rep. | 280/47.18 |
| 614771 | 12/1948 | United Kingdom | 280/46 |
| 1147005 | 4/1969 | United Kingdom | 280/47.18 |

Primary Examiner—John A. Pekar
Attorney, Agent, or Firm—Kolisch, Hartwell & Dickinson

[57] ABSTRACT

A hand truck which is convertible to a steerable wagon by means of a steering assembly fastenable to the hand truck handles. A body member and bottom member fastenable to the frame of the hand truck form the side walls and bottom, respectively, of the wagon.

3 Claims, 7 Drawing Figures

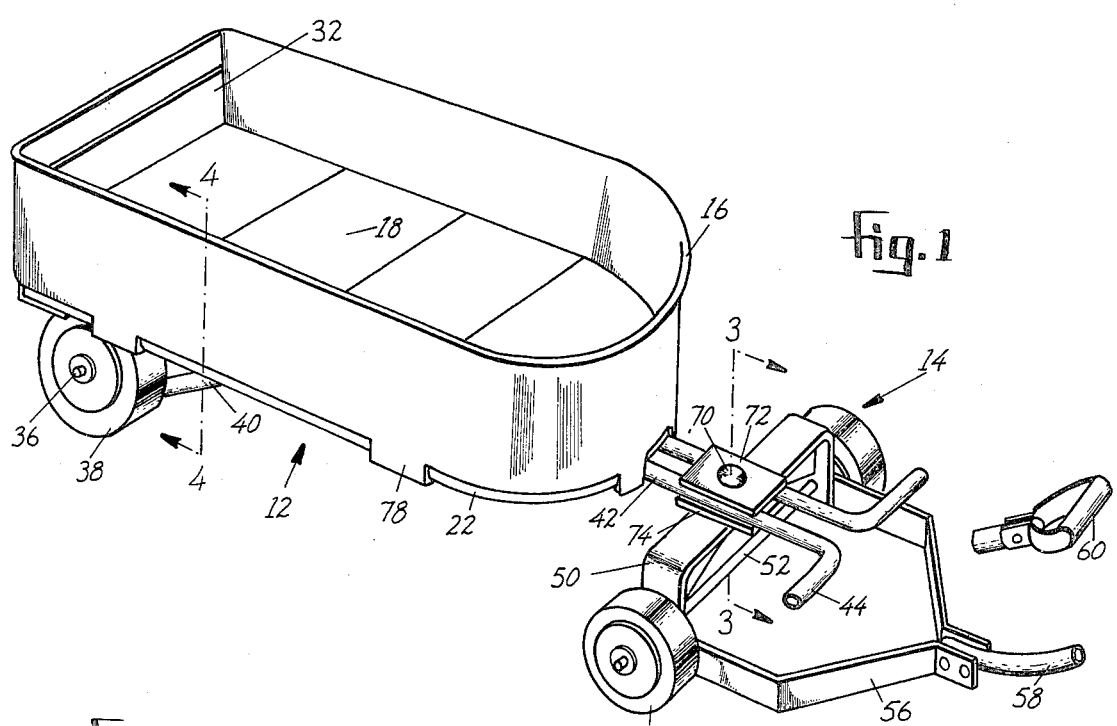
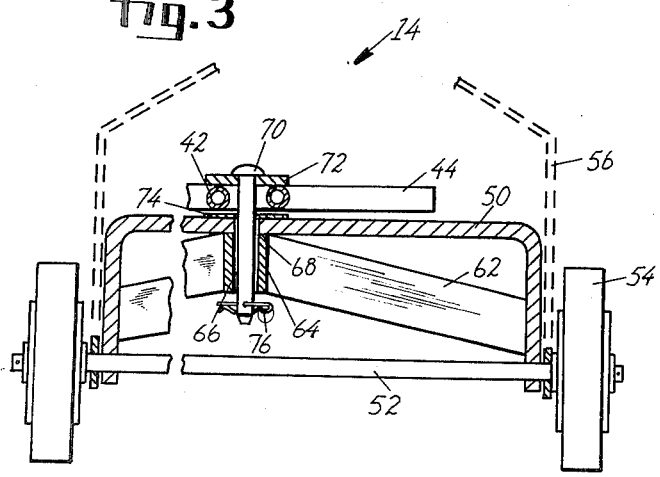
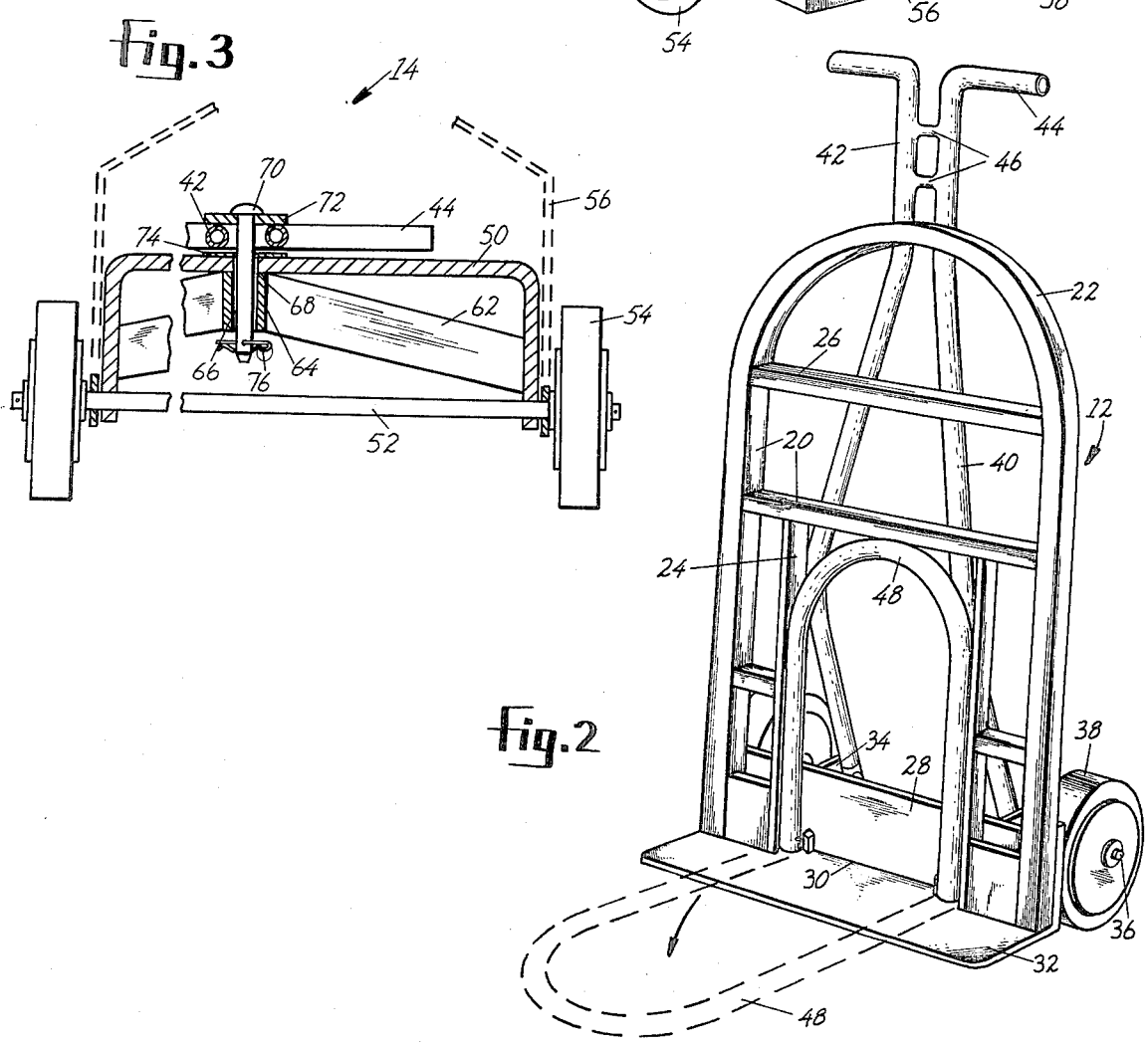

CONVERTIBLE HAND TRUCK-WAGON

CROSS REFERENCE TO RELATED APPLICATION

This application is a continuation-in-part of application Ser. No. 871,007, filed Jan. 20, 1978, now abandoned.

BACKGROUND AND SUMMARY OF THE INVENTION

This invention relates to hand trucks, and in particular, to hand trucks convertible to four-wheeled vehicles.

Heretofore, interconvertible hand truck-wagons which have been proposed have provided a set of caster wheels at the upper portion of the hand truck, permitting the hand truck to be horizontally disposed and used as a flatbed wagon. This arrangement has not been entirely satisfactory in that caster wheels are dificult to steer, particularly if the weight being supported by the flatbed wagon is great, as would be the case, for example, in moving a piano or the like by such flatbed wagon.

In other uses of convertible hand truck-wagons, it is desirable to have a wagon with a bottom and sides so that small items can be stacked and held within the wagon. Heretofore, no interconvertible hand truck wagon proposed makes provision for a wagon with bottom and sides.

The present invention is a convertible hand truck-wagon comprising a hand truck with outwardly extending handles and a front wheel assembly demountably fastenable to the handles to form a wagon having steerable front wheels. The hand truck is further adapted to receive a body member and bottom member which form the sides and bottom respectively, of the wagon.

It is a principle object of this invention to provide an interconvertible hand truck-wagon which is easily steered and which can be equipped with bottom and sides.

It is a further object of the invention to provide a wagon convertible from a hand truck adapted to receive a seat for use as a push cart coaster.

It is a further object of the invention to provide a hand truck adapted for carrying various types of accessories such as a golf bag, fertilizer spreader, etc.

BRIEF DESCRIPTION OF THE DRAWINGS

These and other objects and features of the invention will now be described with reference to the following description of the preferred embodiments of the invention and the accompanying drawings, wherein:

FIG. 1 is a perspective view of the hand truck-wagon according to an embodiment of the invention;

FIG. 2 is a perspective view of the hand truck of the present invention;

FIG. 3 is a sectional, foreshortened view of the front wheel assembly taken along line 3—3 of FIG. 1;

DETAILED DESCRIPTION OF THE INVENTION

The basic hand truck-wagon of the present invention, shown in FIG. 1, includes a hand truck 12, a demountable front wheel assembly 14, body member 16 and bottom member 18.

Figure 5:
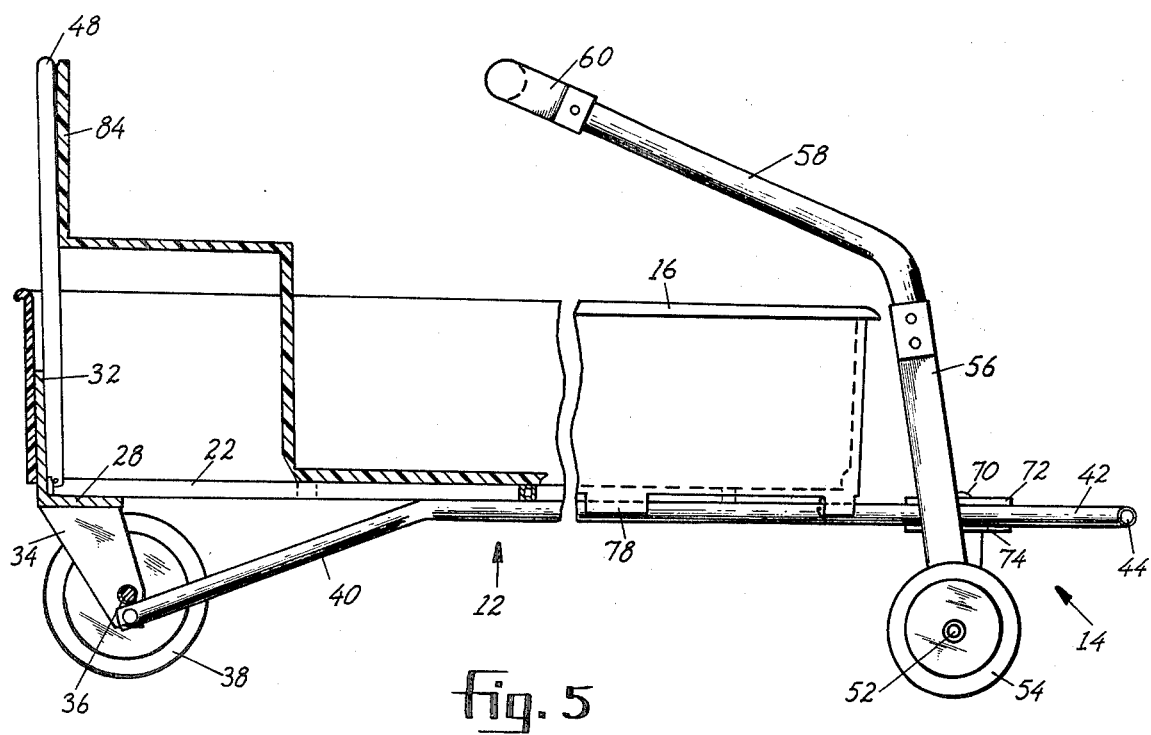
FIG. 5 is a fragmentary, partially sectional view of the hand truck-wagon with auxiliary seat.

Referring to FIG. 2, hand truck 12 comprises a frame 20 having a U-shaped square bar 22 reinforced by plates 24 and square tubes 26 welded to bar 22. The frame is attached by conventional means to the rear plate 28 of angle plate 30, the outwardly extending plate of which serves as the lift plate 32 of the hand truck. A pair of wheel braces 34 attached to rear plate 28 form a bracket for supporting an axle 36 and rotatably mounted wheels 38 (FIG. 5).

The hand truck frame is further reinforced by a pair of frame tubes 40 which are rigidly attached at their lower ends to braces 34 and welded to frame 20 at points of mutual contact. The portions of frame tubes 40 extending above bar 22 form a pair of outwardly extending handles 42 which are bent at their ends to form handle gripping portions 44. The mutually co-extensive portions of the handles are joined by cross pieces 46, forming an opening therebetween for receiving a pin therethrough, in a manner to be described.

Figure 4:
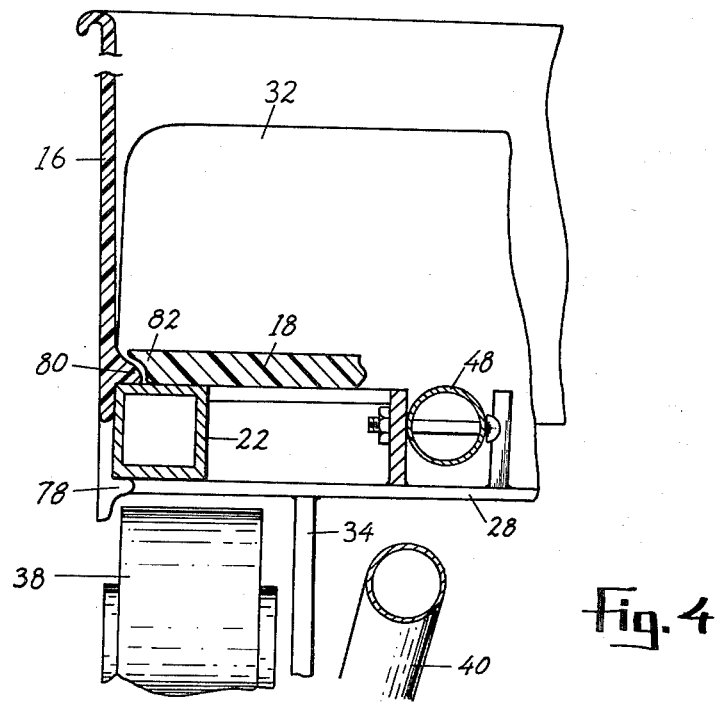
FIG. 4 is fragmentary sectional view of the wagon taken along line 4—4 of FIG. 1.

A U-shaped tube is pivotably attached to angle plate 30 by the bracket arrangement shown in FIG. 4. This tube serves as a retractible lift plate extension member 48, positionable between an extended position (FIG. 2, dotted lines) and a retracted position coextensive with frame 20 (FIG. 2, solid lines).

The above-described hand truck is converted to a wagon by demountably fastening front wheel steering assembly 14 to the outwardly extending hand truck handles and by demountably fastening body member 16 and bottom panels 18 to hand truck frame 20.

The front wheel assembly, detailed in FIG. 3, includes a bracket 50 which supports an axle 52 and rotatably mounted wheels 54. Bracket 50 is reinforced by a pair of angle plates 62 which support, at the mid-region of the bracket, a cylindrical sleeve 64, the bore 66 of which conincides with a hole 68 in the center of the upper portion of bracket 50.

A yoke and tongue assembly comprising yoke 56 supporting a steering tongue 58 and a distally-attached steering handle 60 is pivotally attached to axle 52. The assembly allows the wagon handle to be positioned for pulling (FIG. 1) or for steering within the wagon (FIG. 5).

The wheel assembly is demountably fastened to the horizontally disposed hand truck for pivotal motion about pin means including a vertical pin 70, as shown in FIG. 3. Pin 70 extends through from top to bottom, an upper mounting plate 72, the handle opening formed by cross pieces 46, a lower mounting plate 74, bracket 50 and bore 66. Pin 70 is secured loosely at its lower end by a cotter pin 76. As can be appreciated from FIGS. 1 and 3, mounting plates 72 and 74 serve to maintain the plane of handles 42 parallel to the top portion of wheel bracket 50.

Not shown in the drawings is an optical internal combustion engine mounted on bracket 50 of the front wheel assembly. This engine is coupled by suitable means to wheels 54 for driving the front wheel assembly, thus to power the wagon.

The wagon is additionally provided with body member 16 demountably fastenable to hand truck frame 20 to form the upstanding sides of the wagon, and with bottom member 18 demountably fastenable to frame 20 to form the bottom of the wagon.

Body member 16 is preferably a wrap-around shell formed from a single molded plastic piece. This member fits over U-shaped tube 22 and is gripped firmly thereon by clamps or tabs 78 which are carried on lower opposed side portions of the shell for engaging the lower surface of opposed arms of tube 22, and a lip 80 which engages the upper surface of associated opposed arms of tube 22, as illustrated in FIG. 4.

Bottom member 18, which preferably is formed from plywood or plastic, may comprise a plurality of bottom panels, as shown in FIG. 1, or a single large panel. The edge of the bottom member is provided with a lip 82 which interfits with body member lip 80 to hold the bottom member in place.

In FIG. 5, the wagon shown is equipped with an auxiliary seat 84, which converts the wagon to a downhill pushcart. The seat is detachably mounted to bottom member 18, with the back of the seat being supported, in any conventional manner, by extension member 48 in its extended position.

Figure 6:
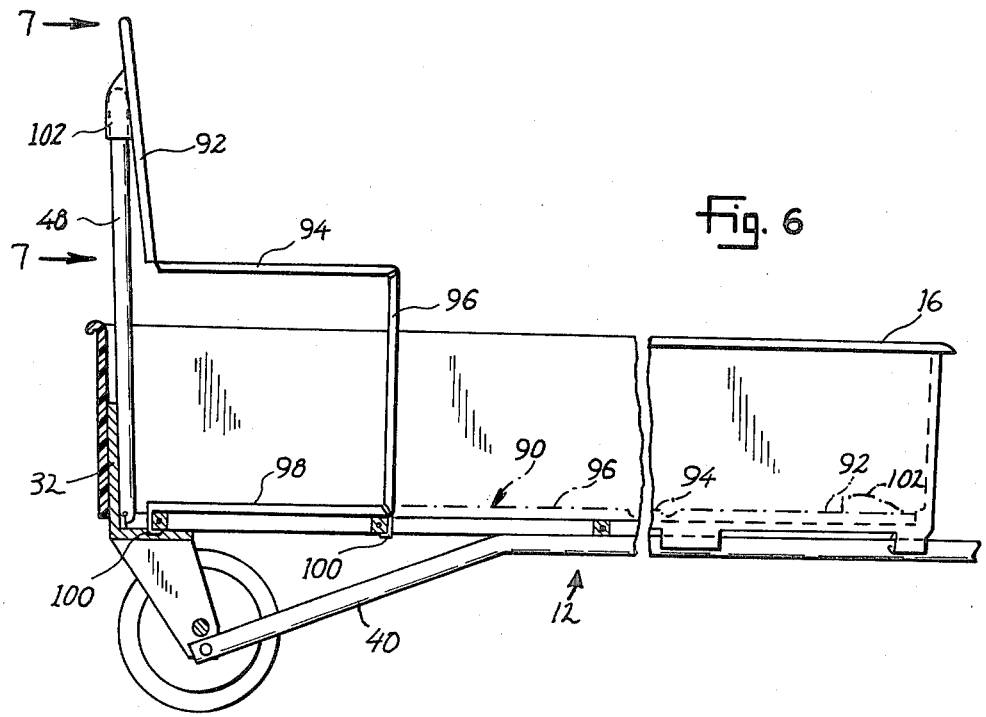
FIG. 6 is a view similar to FIG. 5, showing an alternate embodiment of an auxiliary wagon seat.

In an alternate embodiment of the invention, a bottom member, indicated at 90 in FIG. 6, is composed of four sections 92, 94 (shown fragmentarily), 96 and 98 which are pivotally connected edge-to-edge for selected folding between planar and folded configurations, wherein member 90 is detachably mountable to the frame to form a floor thereof and a seat thereon, respectively. The first, second and third sections 92, 94 and 96 of member 90 are shown in dotted lines in the planar configuration of the member, and solid lines in the seat configuration. The fourth section, which retains the same positions in both configurations, is shown in solid line in the figure.

Figure 7:
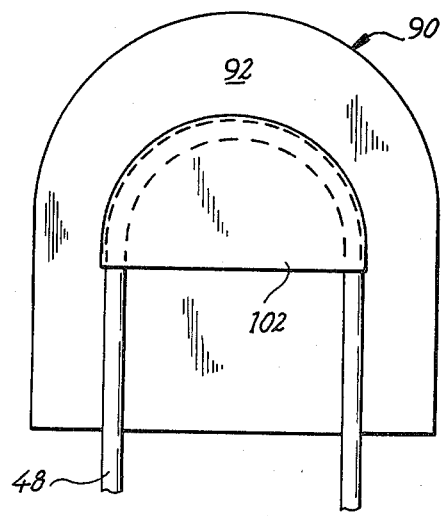
FIG. 7 is a view of the seat of FIG. 6 taken generally along the line 7—7 therein.

First section 92 is rounded at its upper edge, (FIG. 7), to conform to the rounded front portion of the side member 16, as seen in FIG. 1. Attached to the upwardly-facing surface of section 92 in FIG. 6, and preferably integrally formed therewith is a substantially semi-circular sleeve 102 dimensioned to slip over the upper portion of member 48, in a manner to be described.

A pair of tabs 100 carried on the lower side of section 98 in FIG. 6 are engageable with suitable frame members for detachably mounting this section to the frame. Tabs 100, cooperating with the foldable joinder between the third and fourth sections, are also referred to herebelow as securing means for detachably securing the third section 96 to the frame.

The four sections are preferably formed of a single piece of molded plastic, the sections being somewhat thick and inflexible, and the joinder between the sections being thinner and flexible, allowing adjacent sections to be relatively folded to form at least a 90° angle therebetween.

To form the auxiliary wagon seat, first, second and third sections of member 90 are folded in the manner indicated to form the back, seat, and seat support portions, respectively, of the seat. Sleeve 102 is slipped over the upper portion of the extension member 48 to secure the section to the member in a manner which supports section 92 thereto, serving to support the seat in its folded configuration. Sleeve 102 is also referred to herebelow as fastening means for fastening the first section to the extension manner. By the arrangement just-described, a wagon having a multi-section floor, such as shown in FIG. 1, can be easily converted to a pushcart having a rear seat.

It will be apparent to those skilled in the art that numerous changes can be made in the size, number and arrangements of parts without departing from the true nature of the invention as claimed below.

It is claimed and desired to secure by Letters Patent:

1. A convertible hand truck-wagon comprising
   a hand truck having a frame, handles attached to said frame and extending outwardly therefrom, means on said handles defining an opening, a pair of wheels rotatably mounted on the lower end of the frame, and a lift plate attached to said lower end, extending substantially perpendicular thereto,
   a steerable front wheel assembly including a bracket, means on said bracket defining a bore, a pair of wheels rotatably mounted on said bracket, and a yolk and tongue assembly pivotally mounted on said bracket,
   pin means insertable through said opening and said bore to detachably mount said front wheel assembly to said handles for pivoting relative thereto about a substantially vertical axis, and
   a body member having upstanding sides and opposed frame-engaging clamps on lower portions thereof, said clamps being adapted to releasably engage opposite regions of said frame, thus to clamp said member on said frame.

2. A convertible hand truck-wagon comprising
   a hand truck having a frame, handles attached to the frame, said handles extending outwardly therefrom, a pair of wheels rotatably mounted on the lower end of the frame, and a lift plate attached to said lower end, extending substantially perpendicular thereto,
   a steerable front wheel assembly mountably fastenable to said handles to form a wagon having steerable front wheels,
   a lift plate extension member pivotally attached to said lower end for swinging between extended and retracted positions, wherein the extension member occupies a plane which is substantially parallel to planes occupied by the lift plate and the frame, respectively,
   a floor member including first, second and third sections pivotally connected edge-to-edge for selected folding between a substantially planar configuration, wherein said member may be detachably mounted on said frame to form a floor thereof, and a folded configuration wherein said first, second and third sections form the back, seat and seat support portions, respectively, of a seat which is mountable on said hand truck, with said first section being disposed adjacent said extension member, when the latter is in its extended position, and with said third section being supported by said frame,
   fastening means for fastening said first section on said extension member, and
   securing means for detachably securing said third section to said frame.

3. The hand truck-wagon of claim 2 wherein said securing means includes a fourth section pivotally connected edge-to-edge to said third section, opposite said second section, said fourth section being detachably mountable on said frame, adjacent said lift member, and forming a portion of said floor when said member is in its planar configuration.

* * * * *